United States Patent
Li (10) Patent No.: US 7,333,421 B2
(45) Date of Patent: Feb. 19, 2008

(54) OFDM-MIMO COMMUNICATION SYSTEM USING SMART SPATIAL SYMBOL MAPPING AND ASSOCIATED METHODS

(75) Inventor: Yingxue Li, Exton, PA (US)

(73) Assignee: Interdigitial Technology Corporation, Wilimington, DE (US)

( * ) Notice: Subject to any disclaimer, the term of this patent is extended or adjusted under 35 U.S.C. 154(b) by 171 days.

(21) Appl. No.: 11/358,618

(22) Filed: Feb. 21, 2006

(65) Prior Publication Data

US 2006/0209667 A1  Sep. 21, 2006

Related U.S. Application Data

(60) Provisional application No. 60/655,057, filed on Feb. 22, 2005.

(51) Int. Cl.
H04B 7/02  (2006.01)
H04J 11/00  (2006.01)

(52) U.S. Cl. .................. 370/208; 370/343; 375/299
(58) Field of Classification Search ............... 370/208, 370/343; 375/267, 299, 347
See application file for complete search history.

(56) References Cited

U.S. PATENT DOCUMENTS 6,185,258 B1  2/2001  Alamouti et al. ........... 375/260
2004/0233838 A1*  11/2004  Sudo et al. ................. 370/208
2006/0088114 A1*  4/2006  Chen et al. ................. 375/260
2006/0193396 A1*  8/2006  Li ............................. 375/267

\* cited by examiner

*Primary Examiner*—Melvin Marcelo
(74) *Attorney, Agent, or Firm*—Allen, Dyer, Doppelt, Milbrath & Gilchrist, P.A.

(57) ABSTRACT

A transmitter in an OFDM-MIMO wireless communication system uses multiple antennas to transmit each data stream. Before the coded binary bits are mapped into channel symbols, they are divided into two groups. One group is mapped to a channel symbol as in a conventional system. Another group of binary bits is used to generate a spatial mapping index. The spatial mapping index determines which antenna is to be used to transmit the channel symbol for each subcarrier. Effectively, information bits are jointly represented by a combination of a channel symbol and an antenna that transmits the channel symbol. Therefore, to achieve the same data rate, a smaller signal constellation is required. In addition, spatial diversity can be achieved which is similar to traditional switching diversity. The number of non-zero subcarriers is reduced by half on average, which results in a lower peak to average ratio than conventional OFDM systems.

31 Claims, 4 Drawing Sheets

OFDM-MIMO COMMUNICATION SYSTEM USING SMART SPATIAL SYMBOL MAPPING AND ASSOCIATED METHODS

RELATED APPLICATION

This application claims the benefit of U.S. Provisional Application Ser. No. 60/655,057 filed Feb. 22, 2005, the entire contents of which are incorporated herein by reference.

FIELD OF THE INVENTION

The present invention relates to wireless communication systems, and more particularly, to a wireless communication system using orthogonal frequency division multiplex (OFDM) modulation and equipped with multiple transmit and receive antennas.

BACKGROUND OF THE INVENTION

A multiple-input multiple-output (MIMO) wireless communication system includes a plurality of antenna elements at the transmitter and a plurality of antenna elements at the receiver. A respective antenna array is formed at the transmitter and at the receiver based upon the antenna elements associated therewith. The antenna elements are used in a multi-path rich environment such that due to the presence of various scattering objects in the environment, each signal experiences multipath propagation.

MIMO communication systems are advantageous in that they enable the capacity of the wireless link between the transmitter and receiver to be improved. The multipath rich environment enables multiple channels to be generated therebetween. Data for a single user can then be transmitted over the air in parallel over those channels, simultaneously and using the same bandwidth.

Orthogonal frequency division modulation (OFDM) is also effective in multipath environments without involving complicated receiver designs. A combination of OFDM and MIMO techniques has been adapted into various standards, such as 802.11n and Evolved UTRA (E-UTRA), and is promising for next generation wireless data communications.

Figure 1:
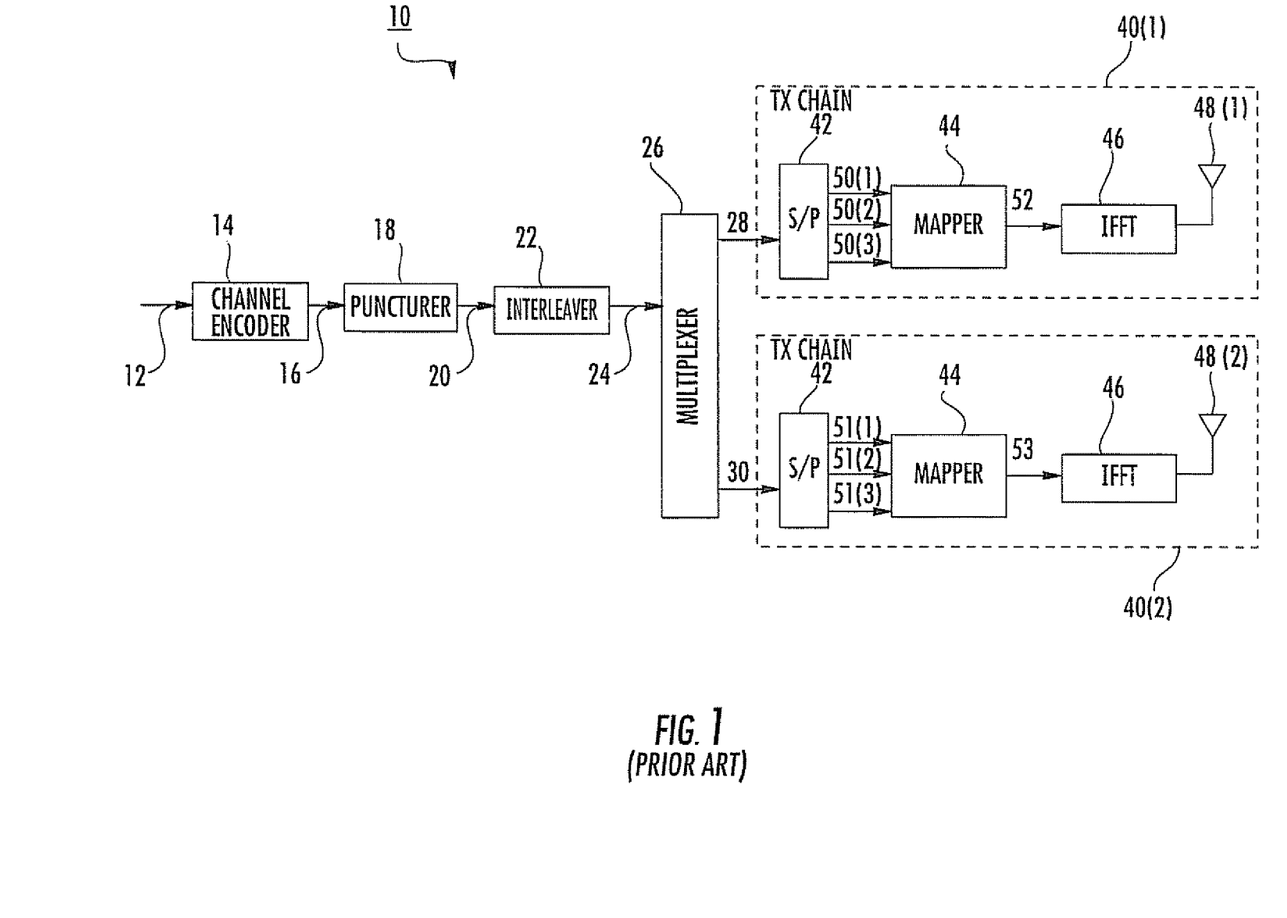
FIG. 1 is a block diagram of an OFDM-MIMO transmitter in accordance with the prior art.

In an OFDM-MIMO transmitter 10, as shown in FIG. 1, a serial bit information stream 12 is coded by a channel encoder 14 to improve link reliability. The coded serial bit information stream 16 is then punctured by a puncturer 18 to achieve a desirable data rate. The punctured coded serial bit information stream 20 is then interleaved by an interleaver 22 to avoid burst errors.

The interleaved bits 24 are then divided by a multiplexer 26 into multiple serial bit information substreams 28, 30 to increase total data throughput. A plurality of transmitter chains 40 is coupled to the multiplexer 26, with each transmitter chain receiving a respective serial bit information substream 28, 30.

Each transmitter chain 40 includes a serial-to-parallel converter 42 for converting the respective serial bit information substream to a parallel bit information bit substream. In the illustrated example, 3 channel bits 50(1)-50(3), 51(1)-51(3) are provided from the serial-to-parallel 42 to a signal mapper 44. The signal mapper 44 maps the 3 channel bits 50(1)-50(3), 51(1)-51(3) to a channel symbol 52, 53.

A block of the channel symbol 52 is then modulated by an OFDM modulator, such as an inverse fast Fourier transform (IFFT) module 46. The length of the channel symbol block to be modulated by the OFDM modulator 46 is determined by total number of subcarriers. The OFDM modulator converts a frequency domain signal to a time domain signal. The time domain signal is transmitted by a transmit antenna 48(1), 48(2). Effectively, each channel symbol 52, 53 is transmitted on a subcarrier and the channel symbol block occupies the whole bandwidth.

There are several potential problems associated with the conventional OFDM-MIMO transmitter 10. To achieve high data rates in evolving wireless standards, high-order modulation schemes such as 16 QAM and 64 QAM are used. However, these high-order modulation schemes require a higher signal-to-noise (SNR) ratio to achieve certain bit error rates (BER). Modulation schemes that require high SNR to achieve certain bit error rates are adversely affected in multipath fading environments, thus causing the wireless links to be unreliable. Moreover, the peak-to-average ratio (PAR) is high in any OFDM system. High PAR causes problems in RF circuitry design, especially in the power amplifiers.

SUMMARY OF THE INVENTION

In view of the foregoing background, it is therefore an object of the present invention to provide a robust OFDM-MIMO communication system that achieves desired bit error rates with reduced signal-to-noise ratios.

This and other objects, features, and advantages in accordance with the present invention are provided by an OFDM-MIMO wireless communication system comprising a transmitter comprising a multiplexer for dividing a serial bit information stream into a plurality of serial bit information substreams, and a plurality of transmitter chains coupled to the multiplexer.

Each transmitter chain receives a respective serial bit information substream and may comprise a serial-to-parallel converter coupled to the multiplexer for converting the respective serial bit information substream to a parallel bit information substream, and a signal mapper is coupled to the serial-to-parallel converter for receiving as input a first group of bits from the parallel bit information substream. Each signal mapper corresponds to a specific subcarrier. An antenna selector having a first input is coupled to the serial-to-parallel converter for receiving a second group of bits from the parallel bit information substream, and a second input is coupled to the signal mapper for receiving a channel symbol therefrom.

A plurality of OFDM modulators may be coupled to a plurality of outputs from the antenna selector. A transmit antenna is coupled to each OFDM modulator. The antenna selector selects one of the transmit antennas for transmitting the channel symbol for each subcarrier based upon the second group of bits from the serial-to-parallel converter.

The antenna selector in each transmitter chain provides the channel symbol to the OFDM modulator associated with the selected transmit antenna, while also providing placeholders to the OFDM modulators associated with the non-selected transmit antennas. The antenna selector in each transmitter chain alternates selecting each one of the transmit antennas associated therewith for transmitting the channel symbols based upon the second group of bits from the serial-to-parallel converter.

The OFDM-MIMO communication system in accordance with the present invention improves robustness in the data link between the transmitter and a receiver. The transmitter uses a smaller signal constellation for the same data rate, therefore requires less SNR to achieve the same packet error rate (PER) under certain circumstances. This is based upon the transmitted information bits being jointly represented by channel symbols and antenna selection bits.

Another advantage is that spatial diversity is achieved since coded bits are effectively distributed among multiple transmit antennas. In addition, for each OFDM modulator receiving the placeholders, the average non-zero inputs is reduced on average to half as compared to conventional OFDM-MIMO communication systems, which results in a lower peak to average ratio of the resulting OFDM waveform.

Each transmit antenna may comprise a directional antenna. Alternatively, each transmit antenna may comprise an omni-directional antenna.

The transmitter may also periodically transmit reference signals from each transmit antenna for each transmitter chain. The wireless communication system further comprises a receiver comprising a plurality of receive antennas, a plurality of OFDM demodulators coupled to the plurality of receive antennas, and a plurality of channel estimators coupled to the plurality of OFDM demodulators.

Each channel estimator may receive the periodically transmitted reference signals from each transmit antenna, and may estimate radio frequency (RF) characteristics between each respective transmit antenna and a respective receive antenna associated with the channel estimator.

The receiver may further comprise a plurality of signal demappers coupled to each OFDM demodulator, with each signal demapper corresponding to a respective subcarrier. Each demapper may determine which channel symbol was transmitted and which transmit antenna was used to transmit the channel symbol. This may be determined by each demapper comparing the channel symbol to the estimated channel symbols transmitted from each transmit antenna. If necessary, the demapper may also calculate soft bit output to facilitate channel decoding.

Another aspect of the present invention is directed to a method for communicating between a transmitter and a receiver in a wireless communication system as defined above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

An OFDM-MIMO wireless data communication system in accordance with the present invention combines antenna pattern modulation with traditional OFDM modulation techniques. Information bits are jointly represented by channel symbols and antenna selection bits. This combination effectively uses a smaller signal constellation as compared to using only traditional modulation techniques to achieve the same data transfer rate. Moreover, this combination requires less transmission power to achieve the same bit error rate (BER).

Another advantage of the OFDM-MIMO communication system is that spatial diversity is achieved since coded bits are effectively distributed among multiple transmit antennas. In addition, for each OFDM modulator receiving placeholders, the average number of non-zero subcarriers is reduced on average to half as compared to conventional OFDM-MIMO communication systems, which results in a lower peak to average ratio of the resulting OFDM waveform.

Figure 2:
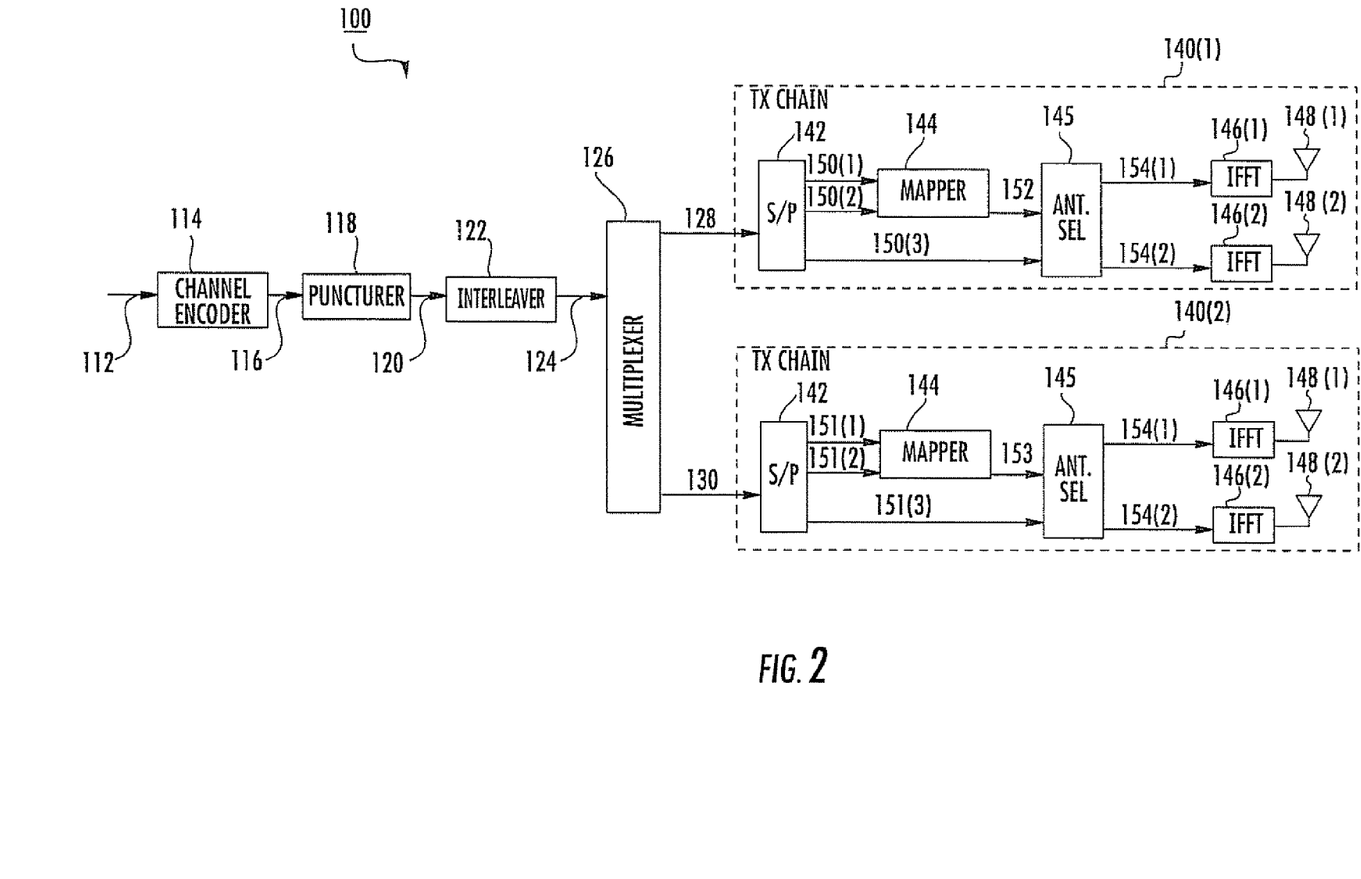
FIG. 2 is a block diagram of an OFDM-MIMO transmitter in accordance with the present invention.

Referring now to the transmitter 100 illustrated in FIG. 2, a serial bit information stream 112 is coded by a channel encoder 114 to improve link reliability. The coded serial bit information stream 116 is then punctured by a puncturer 118 to achieve a desirable data rate. The punctured coded serial bit information stream 120 is then interleaved by an interleaver 122 to avoid burst errors.

The interleaved bits 124 are then divided by a multiplexer 126 into multiple serial bit information substreams 128, 130 to increase total data throughput. A plurality of transmitter chains 140 is coupled to the multiplexer 146, with each transmitter chain receiving a respective serial bit information substream 128, 130.

Each transmitter chain 140 includes a serial-to-parallel converter 142 for converting the respective serial bit information substream to a parallel bit information bit substream. In the illustrated example, 3 channel bits 150(1)-150(3), 151(1)-151(3) are provided from the serial-to-parallel 142.

Also in each transmitter chain 140, a signal mapper 144 is coupled to the serial-to-parallel converter 142 for receiving as input a first group of bits 150(1)-150(2), 151(1)-151(2) from the parallel bit information substream 128, 130. An antenna selector 145 has a first input coupled to the serial-to-parallel converter 142 for receiving a second group of bits 150(3), 150(3) from the parallel bit stream information substream, and a second input is coupled to the signal mapper 144 for receiving a channel symbol 152, 153 therefrom.

In the illustrated example, a pair of OFDM modulators, such as inverse fast Fourier transform (IFFT) modules 146, is coupled to a respective pair of outputs from the antenna selector 145. Each IFFT module 146(1), 146(2) buffers the received channel symbol 152, 153 to form a block of channel symbols. The length of the channel symbol block is determined by the total number of data subcarriers. Each channel symbol within the channel symbol block represents the data to be transmitted over a specific subcarrier. Each IFFT module 146(1), 146(2) then modulates a block of received channel symbols 152, 153 and converts a frequency domain signal to a time domain signal to be transmitted by a transmit antenna 148(1), 148(2).

On a subcarrier by subcarrier basis, the antenna selector 145 selects one of the transmit antennas 148(1), 148(2) for transmitting the channel symbol 152, 153 based upon the second group of bits 150(3), 151(3) (i.e., an antenna select bit) from the serial-to-parallel converter 142. More particularly, the antenna select bit 150(3), 151(3) in each transmitter chain 140(1), 140(2) is used to select a particular transmit antenna 148(1) or 148(2).

In the illustrated example, the antenna select bit 150(3), 151(3) is a single bit, and consequently, can be used to select 1 of 2 different antennas 148(1) or 148(2). If more than two transmit antennas 148(1), 148(2) are coupled to the antenna selector 145, the antenna select bit 150(3), 151(3) will be more than one bit in order to provide more than two different transmit antenna selections, as readily appreciated by those skilled in the art.

If antenna select bit 150(3), 151(3) of a specific subcarrier takes a value of 0, then the channel symbol 152, 153 for this subcarrier is sent to OFDM modulator 146(1), while a placeholder of 0 would be sent to OFDM modulator 146(2) for this specific subcarrier. Similarly, if antenna select bit 150(3), 151(3) of a specific subcarrier takes a value of 1, then the channel symbol 152, 153 for this subcarrier is sent to OFDM modulator 146(2), while a placeholder of 0 would be sent to OFDM modulator 146(1). This is repeated in each transmitter chain 140(1), 140(2).

For each OFDM modulator 146(1), 146(2) receiving the placeholders, the number of non-zero inputs (subcarriers) is reduced on average to half as compared to conventional OFDM-MIMO transmitters, which results in a lower peak to average ratio of the resulting OFDM waveform. Even though the illustrated OFDM-MIMO transmitter 100 has only two transmitter chains 140(1) and 140(2), the present invention may be applied to an OFDM-MIMO transmitter with more than two transmitter chains, as readily appreciated by those skilled in the art.

As noted above, information bits transmitted by the transmit antennas 148(1), 148(2) in each transmitter chain 140(1), 140(2) are jointly represented by channel symbols 152, 153 and the antenna selection bit 150(3), 151(3). As a result of the antenna selection bit 150(3), 151(3) selecting between different OFDM modulators 146(1), 146(2) and their corresponding transmit antennas 148(1), 148(2), a smaller signal constellation is required. This combination also requires less transmission power to achieve the same bit error rate (BER).

For comparison purposes, the signal mapper 44 in FIG. 1 modulates the 3 channel bits 50(1)-50(3), 51(1)-51(3) for generating a channel symbol 52, 53. Since there are 3 information bits, the modulation may be 8 PSK. In contrast, the signal mapper 144 in FIG. 2 is QPSK since each symbol is made up of 2 information bits 150(1) and 150(2), 151(1) and 151(2).

The signal mapper 44 in FIG. 1 generates a signal constellation with 8 possible symbol points on an x-y plane, whereas the signal mapper 144 in FIG. 2 only generates a signal constellation with 4 possible symbol points on the x-y plane.

For the signal mapper 144 to generate an equivalent 8 symbol points in the x-y plane, antenna pattern modulation is used. The antenna selector 145 selects one of 2 transmit antennas 148(1), 148(2) to transmit the channel symbol 152, 153. The 2 transmit antennas 148(1), 148(2) in each transmitter chain 140 have unique RF characteristics so that 2 different antenna patterns will be seen by the receiver. Since each of the 4 possible symbol points can be transmitted using one of two different antenna patterns, 8 possible symbols can be detected by an OFDM-MIMO receiver.

The signal constellation for the QPSK modulation used by the signal mapper 62 is significantly less than the signal constellation for the 8 PSK modulation used by the signal mapper 20. Therefore, for the same transmission power, the minimum distance between two distinct signal points of QPSK constellation is much greater than the minimum distance between two distinct signal points of 8 PSK constellation. Consequently, to achieve the same BER, it will require less transmission power when QPSK modulation is used as opposed to when 8 PSk modulation is used.

In this specific example, the signal constellation size for the signal mapper 144 is one-half the size of the signal constellation for the signal mapper 44. Nonetheless, the data rate for the data being transmitted from each transmitter 10, 100 is the same. Under certain circumstances, the transmitter 100 in accordance with the present invention requires less transmission power to achieve the same quality of service or cover a wider range with the same quality of service.

The antenna patterns for the transmit antennas 148(1), 148(2) may be directional or omni-directional. When there is more than one omni-directional antenna, each omni-directional antenna will still be seen differently by the receiver due to multipath fading.

As will be now explained in greater detail, the transmitter 100 is required to periodically transmit know reference bits so that the receiver is able to differentiate between the different values of the antenna selection bit 150(3) and 151(3). These reference bits are referred to as pilot bits, for example. A block diagram of the receiver 200 for receiving the antenna modulated channel symbols is provided in FIG. 3.

For a receiver 200 to measure the RF characteristics of each transmit antenna 148(1), 148(2) associated with each OFDM modulator 146(1), 146(2) for each transmitter chain 140(1), 140(2), known reference bits are periodically transmitted by the transmitter 100. These reference bits are referred to as pilot bits, for example.

Figure 3:
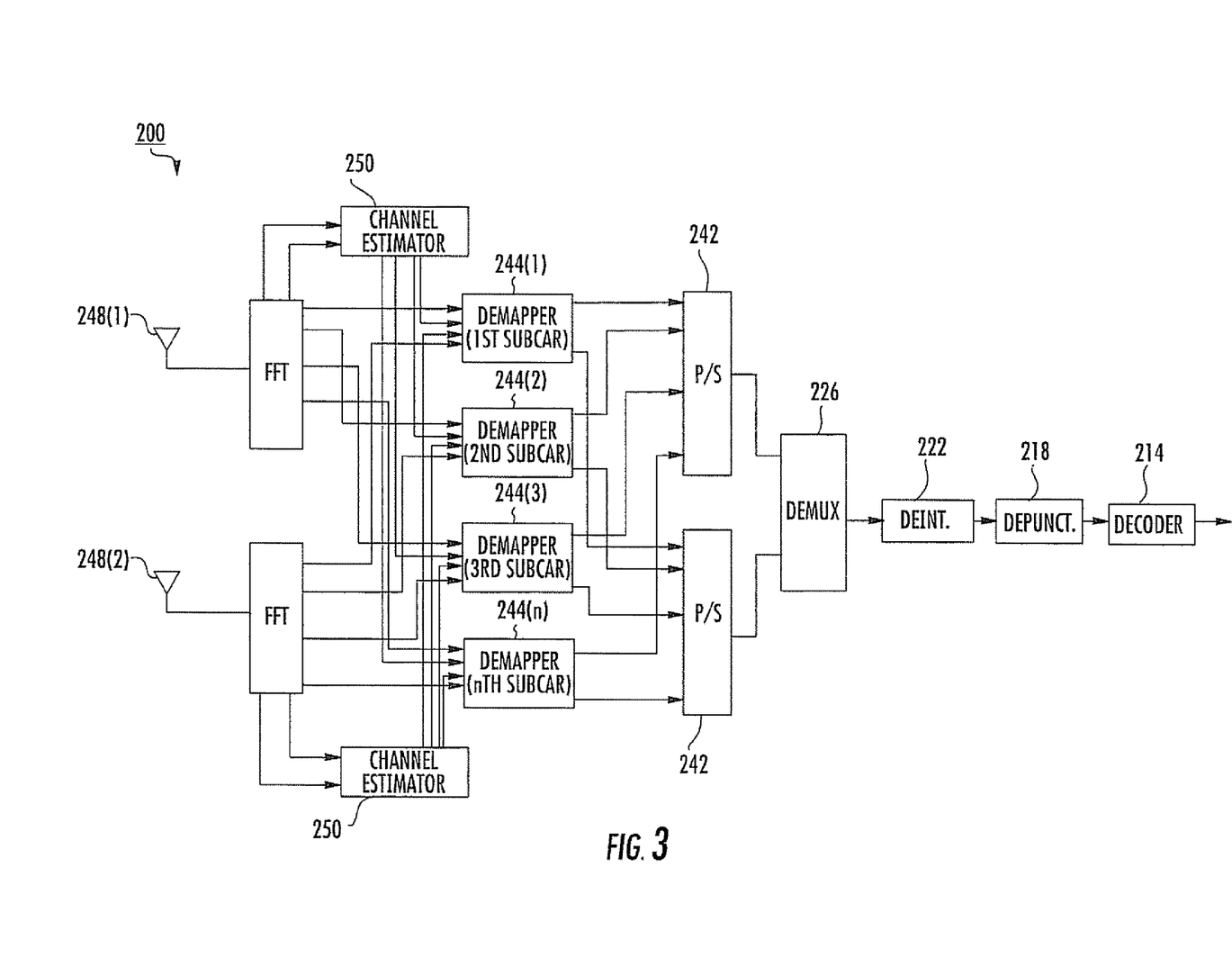
FIG. 3 is a block diagram of a receiver in accordance with the present invention.

A block diagram of the receiver 200 for receiving the antenna modulated channel symbols is provided in FIG. 3. In the illustrated embodiment, the receive antennas 248(1), 248(2) are coupled to respective OFDM demodulators 246(1), 246(2). The OFDM demodulators 246(1), 246(2) are fast Fourier transform (FFT) modules, for example, for converting the received signals from time domain to frequency domain. The OFDM-demodulated signals on each subcarrier include an antenna modulated channel symbol.

As noted above, the transmitter 100 periodically transmits known reference bits so that the receiver 200 is able to differentiate between the different values of the antenna selection bit 150(3), 151(3). These reference bits are referred to as pilot bits, for example.

For a signal received by each receive antenna 248(1), 248(2), it is applied as input to an OFDM demodulator 246(1), 246(2). The OFDM demodulator 246(1), 246(2) buffers the received signal to form a block of receive signals. The length of the receive signal block is determined by the total number of data subcarriers. The received signal block is a time domain signal and is converted into a frequency domain signal by the OFDM demodulator 246(1), 246(2). The output of the OFDM demodulator 246(1), 246(2) is passed to a plurality of demappers 244(1)-244(N).

The output of the OFDM demodulator 246(1), 246(2) is also sent to a channel estimator 250, where the channel estimator 250 extracts the known reference bits from the received signal. These reference bits, which may be pilot bits, for example, are used to estimate the radio frequency (RF) characteristics of the received signal associated with each transmit and receive antenna pair, as readily understood by those skilled in the art. The channel estimator 250 estimates the RF characteristics, and passes the estimated RF characteristics to the demappers 244(1)-244(N).

The RF characteristics of the received signal associated with each transmit and receive antenna pair may include attributes such as amplitude, phase, delay spread and frequency response. The demappers 244(1)-244(n) compute the Euclidean distance (ED) between the received signal and the estimated signals associated with each transmit and receive antenna pair, on a subcarrier basis. The demappers 244(1)-244(N) choose the bits associated with the smallest Euclidean distance as the final output for each subcarrier.

Figure 4A:
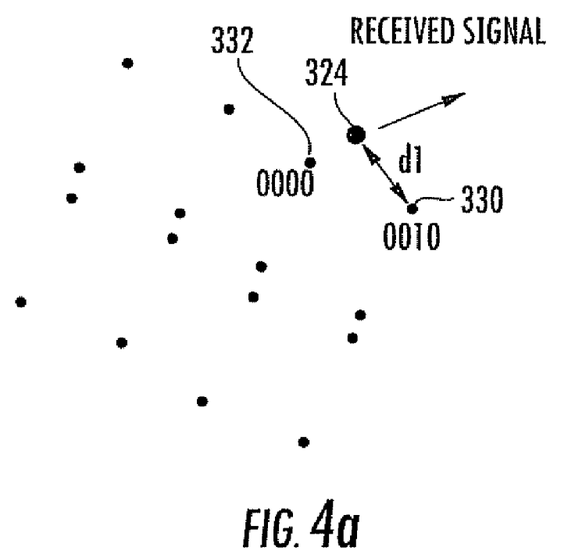
FIG. 4a is a reconstructed constellation for one of the receive antennas shown in FIG. 3.
Figure 4B:
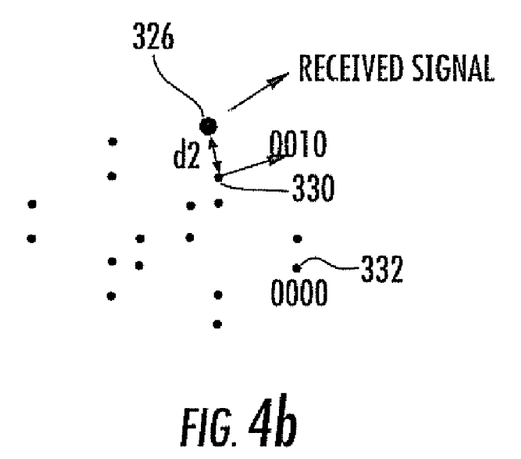
FIG. 4b is a reconstructed constellation for the other receive antenna shown in FIG. 3.

The demappers 244(1)-244(N) will now be described in greater detail while referring to the superimposed constellations as shown in FIGS. 4a and 4b. Each of the demappers 244(1)-244(N) see multiple superimposed constellations, each one being associated with a receive antenna 248(1), 248(2).

Assuming BPSK modulation is used for the channel symbols, and two transmitter chains 140(1), 140(2) are employed at the transmitter 100, then each superimposed constellation at each receiver demapper 244(1)-244(N) would see 16 signal points. Each of 16 signal points is uniquely associated with a bit sequence $a_1c_1a_2b_2$, where c1 and c2 are the respective channel symbols 152, 153 from transmitter chains 140(1) and 140(2). Since BPSK is assumed, one channel symbol only consists of 1 bit. In the bit sequence, $a_1$ and $a_2$ are the respective antenna selection bits 150(3), 151(3) for the transmitter chains 140(1) and 140(2).

When the receiver 200 receives channel estimations from the channel estimators 250, it reconstructs the signal constellation for each subcarrier of the receive antenna 248(1), 248(2). FIGS. 4a, 4b illustrate an example of reconstructed superimposed constellations for the receive antennas 248(1) and 248(2), on a specific subcarrier. If the RF channel characteristics are frequency selective, the reconstructed superimposed constellation would vary subcarrier to subcarrier.

Specifically, FIG. 4a is a reconstructed constellation for receive antenna 248(1) and FIG. 4b is a reconstructed constellation for receive antenna 248(2). The received signal 324, 326 is also marked in FIGS. 4a, 4b. For each receive antenna 248(1), 248(2), the demappers 244(1)-244(N) calculate the distance between the received signal 324, 326 and each of the sixteen candidates. In other words, for each subcarrier received by the receive antenna 248(1), 248(2), there would be sixteen distances, with each distance associated with a unique bit sequence $a_1c_1a_2b_2$.

The distance associated with the same bit sequence is then squared and summed across all receive antennas 248(1), 248(2). The bit sequence associated with the minimum total distance is then selected as final output of the demappers 244(1)-244(N). In the illustrated example, the bit sequence 0010 330 is selected since the total distance d=d1+d2 is minimum among all possible bit sequences.

The distance between the received signal and the reconstructed signal point 0000 330 is minimum for receive antenna 248(1), as shown in FIG. 4a. However, the total distance between signal point 0010 332 and the received signal 330 is minimum. Therefore, bit sequence 0010 332 is selected instead of 0000 330.

Bits from the same spatial stream (e.g., same transmitter chain 140(1) or 140(2)) are then fed to a parallel-to-serial converter 242, where parallel bits in multiple subcarriers are converted into a serial bit sequence. Serial data of all spatial data streams are then demultiplexed by a demultiplexer 226 into a single stream. The single stream is then fed to a deinterleaver 222, a depuncturer 218 and a decoder 214.

The calculation of the Euclidean distance may depend on the RF characteristics. In the example of FIGS. 4a and 4b, RF characteristics between each transmit and receive antenna pair is represented by a complex channel gain.

In the aforementioned example, a hard bit value is output from the demappers 244(1)-244(N). To facilitate channel decoding, it is necessary for the demappers 244(1)-244(N) to output a soft bit value under certain circumstances. Still referring to the OFDM-MIMO receiver 200 illustrated in FIG. 3, signals from the different receive antennas 248(1), 248(2) but same subcarrier are fed into demapping blocks 244(1)-244(N), where soft bits, including both channel bits (e.g., 152 and 153) and antenna selection bits (150(3) and 151(3)) are calculated. One example of a soft bit is a log-likelihood ratio (LLR) of coded bits. If the bit of interest is b0, then the LLR of b0 is defined as:

$$LLR(b_0) = \log \frac{P(b_0 = 0)}{p(b_1 = 0)}$$

Before calculating LLR, the receiver 200 first makes channel estimations via the channel estimators 250 using known reference signals that are regularly transmitted from the transmitter 100. Soft bits corresponding to the same spatial stream (e.g., data streams 128, 130) are then fed to a respective parallel-to-serial converter 242, which converts the parallel data of all the subcarriers into serial data. Serial data of all spatial data streams are then demultiplexed by a demultiplexer 226 into a single stream. As discussed above, the single stream is then fed to a deinterleaver 222, a depuncturer 218 and a decoder 214.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communication system comprising:
   an OFDM-MIMO transmitter comprising
   a multiplexer for dividing a serial bit information stream into a plurality of serial bit information substreams, and
   a plurality of transmitter chains coupled to said multiplexer, each transmitter chain for receiving a respective serial bit information substream and comprising
   a serial-to-parallel converter coupled to said multiplexer for converting the respective serial bit information substream to a parallel bit information substream,
   a signal mapper coupled to said serial-to-parallel converter for receiving as input a first group of bits from the parallel bit information substream, each signal mapper corresponding to a specific subcarrier,
   an antenna selector having a first input coupled to said serial-to-parallel converter for receiving a second group of bits from the parallel bit information substream, and a second input coupled to said signal mapper for receiving a channel symbol therefrom,
   a plurality of OFDM modulators coupled to a plurality of outputs from said antenna selector,
   a transmit antenna coupled to each OFDM modulator, and
   said antenna selector selecting one of said transmit antennas for transmitting the channel symbol for the corresponding subcarrier based upon the second group of bits from said serial-to-parallel converter.

2. A wireless communication system according to claim 1 wherein said antenna selector in each transmitter chain provides the channel symbol to the OFDM modulator associated with the selected transmit antenna, and provides placeholders to the OFDM modulators associated with the non-selected transmit antennas.

3. A wireless communication system according to claim 1 wherein said antenna selector in each transmitter chain alternates selecting each one of said transmit antennas associated therewith for transmitting the channel symbols based upon the second group of bits from said serial-to-parallel converter.

4. A wireless communication system according to claim 1 wherein each transmit antenna comprises a directional antenna.

5. A wireless communication system according to claim 1 wherein each transmit antenna comprises an omni-directional antenna.

6. A wireless communication system according to claim 1 wherein said transmitter periodically transmits reference signals from each transmit antenna for each transmitter chain.

7. A wireless communication system according to claim 6 further comprising a receiver comprising:
a plurality of receive antennas;
a plurality of OFDM demodulators coupled to said plurality of receive antennas; and
a plurality of channel estimators coupled to said plurality of OFDM demodulators, each channel estimator for receiving the periodically transmitted reference signals from each transmit antenna, and estimating radio frequency (RF) characteristics between each respective transmit antenna and a respective receive antenna associated with said channel estimator.

8. A wireless communication system according to claim 7 wherein said receiver further comprises a plurality of signal demappers coupled to each OFDM demodulator, each signal demapper corresponding to a respective subcarrier.

9. A wireless communication system according to claim 7 wherein each demapper determines which channel symbol was transmitted and which transmit antenna was used to transmit the channel symbol for each subcarrier.

10. A wireless communication system according to claim 9 wherein each demapper performs the determining by comparing the received signal to a reconstructed superimposed signal constellation according to the estimated channel estimations.

11. A wireless communication system according to claim 9 wherein each demapper calculates a soft bit value to facilitate channel decoding.

12. A wireless communication system according to claim 1 further comprising a channel encoder for providing the serial bit information stream to said multiplexer.

13. A wireless communication system according to claim 12 further comprising an interleaver coupled between said channel encoder and said multiplexer.

14. A MIMO transmitter comprising:
a multiplexer for dividing a serial bit information stream into a plurality of serial bit information substreams; and
a plurality of transmitter chains coupled to said multiplexer, each transmitter chain for receiving a respective serial bit information substream and comprising
a serial-to-parallel converter coupled to said multiplexer for converting the respective serial bit information substream to a parallel bit information substream,
a signal mapper coupled to said serial-to-parallel converter for receiving as input a first group of bits from the parallel bit information substream, each signal mapper corresponding to a specific subcarrier,
an antenna selector having a first input coupled to said serial-to-parallel converter for receiving a second group of bits from the parallel bit information substream, and a second input coupled to said signal mapper for receiving a channel symbol therefrom,
a plurality of inverse fast Fourier transform (IFFT) modules coupled to a plurality of outputs from said antenna selector,
a transmit antenna coupled to each IFFT module, and
said antenna selector selecting one of said transmit antennas for transmitting the channel symbol for the corresponding subcarrier based upon the second group of bits from said serial-to-parallel converter.

15. A MIMO transmitter according to claim 14 wherein said antenna selector in each transmitter chain provides the channel symbol to the IFFT module associated with the selected transmit antenna, and provides placeholders to the IFFT modules associated with the non-selected transmit antennas.

16. A MIMO transmitter according to claim 14 wherein said antenna selector in each transmitter chain alternates selecting each one of said transmit antennas associated therewith for transmitting the channel symbols based upon the second group of bits from said serial-to-parallel converter.

17. A MIMO transmitter according to claim 14 wherein each transmit antenna comprises a directional antenna.

18. A MIMO transmitter according to claim 14 wherein each transmit antenna comprises an omni-directional antenna.

19. A MIMO transmitter according to claim 14 wherein said transmitter periodically transmits reference signals from each transmit antenna for each transmitter chain.

20. A MIMO transmitter according to claim 14 further comprising a channel encoder for providing the serial bit information stream to said multiplexer.

21. A MIMO transmitter according to claim 20 further comprising an interleaver coupled between said channel encoder and said multiplexer.

22. A method for communicating between a transmitter and a receiver in a wireless communication system, the transmitter comprising a multiplexer and a plurality of transmitter chains coupled to the multiplexer, the method comprising:
dividing a serial bit information stream into a plurality of serial bit information substreams using the multiplexer in the transmitter; and
receiving a respective serial bit information substream at each transmitter chain in the transmitter, and performing the following
converting the respective serial bit information substream to a parallel bit information substream using a serial-to-parallel converter coupled to the multiplexer,
receiving as input at a signal mapper coupled to the serial-to-parallel converter a first group of bits from the parallel bit information substream, each signal mapper corresponding to a specific subcarrier, receiving at an antenna selector having a first input coupled to the serial-to-parallel converter as input a second group of bits from the parallel bit information substream as input, and receiving at a second input coupled to the signal mapper a channel symbol therefrom, and selecting via the antenna selector one of a plurality of transmit antennas coupled to a plurality of OFDM modulators which are connected to the antenna selector, the transmit antennas for transmitting the channel symbol for the corresponding subcarrier based upon the second group of bits from the serial-to-parallel converter.

23. A method according to claim 22 wherein the antenna selector in each transmitter chain provides the channel symbol to the OFDM modulator associated with the selected transmit antenna, and provides placeholders to the OFDM modulators associated with the non-selected transmit antennas.

24. A method according to claim 22 wherein the antenna selector in each transmitter chain alternates selecting each one of the transmit antennas associated therewith for transmitting the channel symbols based upon the second group of bits from the serial-to-parallel converter.

25. A method according to claim 22 wherein each transmit antenna comprises a directional antenna.

26. A method according to claim 22 wherein each transmit antenna comprises an omni-directional antenna.

27. A method according to claim 22 wherein the transmitter periodically transmits reference signals from each transmit antenna for each transmitter chain.

28. A method according to claim 27 wherein the receiver comprises a plurality of receive antennas; and a plurality of OFDM demodulators coupled to the plurality of receive antennas; and a plurality of channel estimators coupled to the plurality of OFDM demodulators, each channel estimator for receiving the periodically transmitted reference signals from each transmit antenna; and estimating radio frequency (RF) characteristics between each respective transmit antenna and a respective receive antenna associated with the channel estimator.

29. A method according to claim 28 wherein the receiver further comprises a plurality of signal demappers coupled to each OFDM demodulator, each signal demapper corresponding to a respective subcarrier.

30. A method according to claim 29 wherein each demapper determines which channel symbol was transmitted and which transmit antenna was used to transmit the channel symbol for each subcarrier.

31. A method according to claim 30 wherein each demapper performs the determining by comparing the received signal to a reconstructed superimposed signal constellation according to the estimated RF characteristics.

\* \* \* \* \*